United States Patent
Huang et al.

(10) Patent No.: US 12,526,705 B2
(45) Date of Patent: Jan. 13, 2026

(54) SYSTEMS AND METHODS FOR IAB MIGRATION

(71) Applicant: ZTE Corporation, Guangdong (CN)

(72) Inventors: Ying Huang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 309 days.

(21) Appl. No.: 18/220,040

(22) Filed: Jul. 10, 2023

(65) Prior Publication Data

US 2023/0354114 A1  Nov. 2, 2023

Related U.S. Application Data

(63) Continuation of application No. PCT/CN2021/071925, filed on Jan. 14, 2021.

(51) Int. Cl.
*H04W 36/00* (2009.01)

(52) U.S. Cl.
CPC ... *H04W 36/0061* (2013.01); *H04W 36/0072* (2013.01); *H04W 36/00698* (2023.05)

(58) Field of Classification Search
CPC ......... H04W 36/0061; H04W 36/0072; H04W 36/00698; H04W 36/18; H04W 36/087; H04W 36/0044; H04W 84/047; Y02D 30/70
See application file for complete search history.

(56) References Cited

U.S. PATENT DOCUMENTS

| | | | |
|---|---|---|---|
| 11,184,869 B2* | 11/2021 | Abedini | H04W 56/0015 |
| 2019/0394738 A1 | 12/2019 | Abedini et al. | |
| 2020/0146076 A1 | 5/2020 | Islam et al. | |
| 2021/0227435 A1 | 7/2021 | Hsieh | |
| 2022/0086936 A1* | 3/2022 | Akl | H04W 76/15 |
| 2022/0264383 A1* | 8/2022 | Teyeb | H04W 36/0058 |
| 2022/0346042 A1* | 10/2022 | Huang | H04W 56/001 |
| 2022/0361067 A1* | 11/2022 | Koskinen | H04B 7/15528 |
| 2023/0039422 A1* | 2/2023 | Wei | H04W 36/125 |

FOREIGN PATENT DOCUMENTS

| | | |
|---|---|---|
| CN | 112106404 A | 12/2020 |
| WO | WO-2019/246446 A1 | 12/2019 |
| WO | WO-2020/214262 A1 | 10/2020 |

OTHER PUBLICATIONS

3rd Generation Partnership Project, "Technical Specification Group Radio Access Network; NG-RAN; F1 application protocol (F1 AP) (Release 16)", 3GPP TS 38.473, V16.3.1, Valbonne, France, Oct. 2020 (455 pages).

Extended European Search Report for EP Appl. No. 21918478.5, dated Dec. 20, 2023 (11 pages).

(Continued)

*Primary Examiner* — Dhaval V Patel
(74) *Attorney, Agent, or Firm* — Foley & Lardner LLP

(57) ABSTRACT

Methods, apparatus, and systems for improving migrations in wireless systems during handover of integrated access and backhaul (IAB) nodes between central units (CU), where one or more user equipment or mobile terminals are connected to an IAB node. The disclosure relates to communicating configuration information for a gradual handover to prevent interference and packet loss.

16 Claims, 11 Drawing Sheets

(56) References Cited

OTHER PUBLICATIONS

Qualcomm Incorporated, "Inter-donor IAB-node Migration", 3GPP TSG-RAN WG3, Meeting #110-e, R3-206256, Nov. 12, 2020, e-Meeting (8 pages).
Vivo, "Missing MSG1 SCS in dedicated Rach", 3GPP TSG-RAN WG2 Meeting #Ad hoc 1802, R2- 1809870, Jul. 6, 2018, Montreal, Canada (2 pages).
International Search Report and Written Opinion for PCT Appl. No. PCT/CN2021/071925, mailed Oct. 11, 2021 (6 pages).
Examination Report for IN Appl. No. 202327047103, dated May 27, 2025 (8 pages).

* cited by examiner

SYSTEMS AND METHODS FOR IAB MIGRATION

CROSS-REFERENCE TO RELATED APPLICATION

This application claims the benefit of priority under 35 U.S.C. § 120 as a continuation of International Patent Application No. PCT/CN2021/071925, filed on Jan. 14, 2021, the disclosure of which is incorporated herein by reference in its entirety.

TECHNICAL FIELD

This disclosure is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

The following aspects may be preferably implemented in various embodiments.

In an aspect, a second parent device receives configuration information that: (a) is used by a wireless device and configured by a first parent device, or (b) is used by at least one of the wireless device's parent nodes and configured by the first parent device. In another aspect, the second parent device performs one of (a) configuring the wireless device or the wireless device's parent node according to the configuration information or (b) sending the configuration information to at least one of the wireless device's parent nodes In an aspect, a second integrated access and backhaul (IAB) donor receives configuration information that: (a) is used by a first IAB-node and configured by a first IAB donor or configuration, or (b) is used by the IAB node or at least one of the IAB node's parent IAB node and configured by the first IAB donor, and uses the configuration information for communications between the first IAB-node and the second IAB donor.

In another aspect, the second IAB donor sends configuration information to at least one of the IAB node's parent IAB nodes. In another aspect, (a) the first IAB donor is a source IAB donor and the second donor is a target IAB donor, and the IAB node migrates from the first IAB donor to the second IAB donor, or (b) the second IAB donor is a source IAB donor and the first donor is a target IAB donor, and the IAB node migrates from the second IAB donor to the first IAB donor, or (c) the first IAB donor is an initial IAB donor and the second donor is a new IAB donor, and the IAB node recovers to the second IAB donor, or (d) the second IAB donor is an initial IAB donor and the first donor is a new IAB donor, and the IAB node recovers to the first IAB donor.

In another aspect, the configuration information comprises radio resource configuration information or cell-specific channel or signal configuration information. In another aspect, the second IAB donor receives the configuration information from a first IAB donor via an Xn Application Protocol (XnAP) message. In another aspect, the second IAB donor receives the configuration information from IAB-DU via an F1 Application Protocol (F1AP) message.

In another aspect, the radio resource configuration information includes at least one of the following: Subcarrier Spacing, or downlink/uplink/flexible (DUF) Transmission Periodicity, DUF Slot Configuration, hard/soft/not available (HSNA) Transmission Periodicity, or HSNA Slot Configuration. In another aspect, the cell-specific channel or signal configuration information includes at least one of the following: IAB SSB (Synchronization Signal Block) transmission configuration (STC) information, RACH Config Common, RACH Config Common IAB, Channel State Information Reference Signals (CSI-RS) Configuration, Scheduling Request (SR) Configuration, Physical Downlink Control Channel (PDCCH) Configuration SIB1

In an aspect, a first IAB donor an IAB node's internet protocol (IP) address information allocated by a second IAB donor performs communication with the IAB node using the IAB node's IP address information. In yet another aspect, (a) the first IAB donor is a source IAB donor and the second IAB donor is a target IAB donor, and the IAB node migrate from the first IAB donor to the second IAB donor; or (b) the second IAB donor is a source IAB donor and the first IAB donor is a target IAB donor, and the IAB node migrate from the second IAB donor to the first IAB donor; or (c) the first IAB donor is a initial IAB donor and the second IAB donor is a new IAB donor, and the IAB node recover to the second IAB donor; or (d) the second IAB donor is a initial IAB donor and the first IAB donor is a new IAB donor, and the IAB node recover to the first IAB donor.

In yet another aspect, the first IAB donor receives the IAB node's IP address information allocated by the second IAB donor via an XnAP message from the second IAB donor. In yet another aspect, the first IAB donor receives the IAB node's IP address information allocated by the second IAB donor or OAM from the IAB node via an F1AP message. In yet another aspect, the IP address information comprise at least one of the following: an IPv4 address, an IPv6 address, an IPv6 prefix, or an IP address usage, where the IP address usage indicates that the IP address information is used for F1-C, or F1-U or non-F1. In yet another aspect, performing communication, at the first IAB donor, with the IAB node using the IAB node's IP address information includes sending F1-C or F1-U packets to the IAB node using the IAB node's IP address information, wherein target information is included in the F1AP message in F1-C packet, wherein target information is the BAP address of the IAB node.

In an aspect, the a first IAB donor receives a QoS mapping information from a second IAB donor and sets DSCP and/or flow label fields for the IP packets which need to be sent to a IAB node according to the QoS mapping information. In yet another aspect, (a) the first IAB donor is a source IAB donor and the second donor is a target IAB donor, and the IAB node migrate from the first IAB donor to the second IAB donor; or (b) the second IAB donor is a source IAB donor and the first donor is a target IAB donor, and the IAB node migrate from the second IAB donor to the first IAB donor; or (c) the first IAB donor is a initial IAB donor and the second IAB donor is a new IAB donor, and the IAB node recover to the second IAB donor; or (d) the second IAB donor is a initial IAB donor and the first IAB donor is a new IAB donor, and the IAB node recover to the first IAB donor. In yet another aspect, the first IAB donor receives a QoS mapping information from the second IAB donor via a XnAP message. In yet another aspect, the QoS mapping information includes at least one of: IP address information, DSCP, flow label, usage information, where the usage information indicates that the QoS mapping information is used for F1-C or F1-U or non-F-1.

In an aspect, a first IAB donor receives indication information from a second IAB donor via an XnAP message or from a IAB node via an F1AP message and determines whether: (a) the IAB node has established an F1 connection or F1 association with the second IAB donor using the indication information; or (b) whether the IAB node has migrated an F1 connection or F1 association to the second IAB donor using the indication information.

In an aspect, a first IAB donor transmits target cell information in an XnAP handover request message to a second IAB donor, the target cell information including at least one of: an indication that the serving cell had not changed, an ID of a serving DU, or source cell information.

In aspects of the disclosure, the transmission and reception of messages is performed by various devices, including MT, UE, IAB nodes (e.g., access, migrating, descendant, or ancestor), and IAB donors.

These, and other, aspects are described in the present disclosure.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems For instance, an integrated access and backhaul (IAB) system supports wireless backhauling by deploying new radio (NR) cells to reduce the need for wireline transport infrastructure. The disclosure is related to improving communications in migrations and, specifically, towards improving gradual migrations.

The terminating node of the NR backhaul network on the network side is commonly referred to as an IAB donor, which represents a gNB, which is the logical node that has additional functionality to support IAB. An IAB node supports gNB Distributed Unit (gNB-DU) functionality, which allows NR access to user equipment (UE) and next-hop IAB nodes. The IAB node also supports functionality for IAB-MT, which allows connections to the gNB-DU of another IAB node or the IAB donor.

Figure 1:
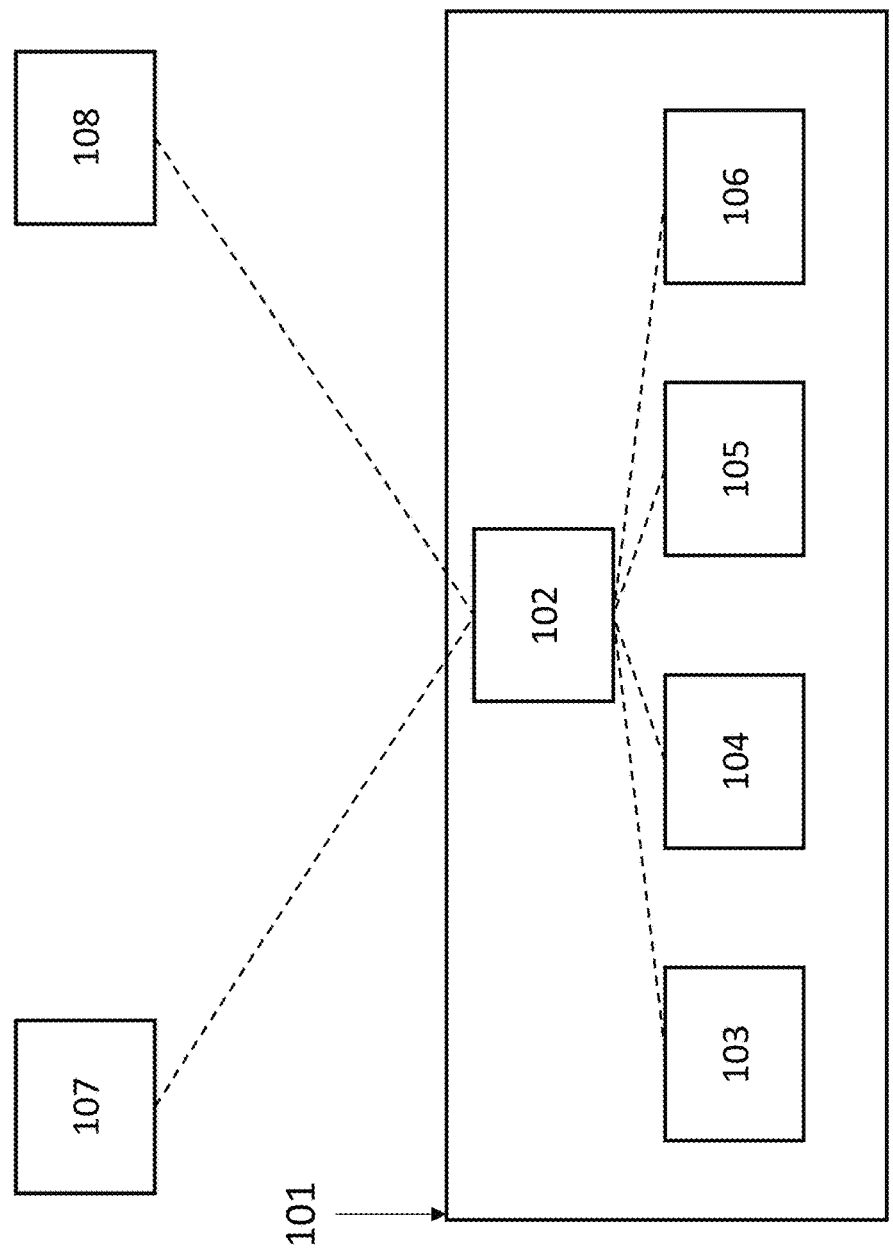
FIG. 1 illustrates an embodiment of an IAB deployment in a moveable vehicle.

In one example, as shown in FIG. 1, a moveable vehicle, such as a high speed train 101 has several passengers with one or more mobile terminal (MT) or user equipment (UE) 103-106. The UE 103-106 are wirelessly connected to an IAB node 102, and the IAB node 102 is in turn connected to a donor node or a parent IAB node 107 or 108. As the high speed train moves, handover between parent IAB nodes occurs. The UE 103-106 accesses the network via the IAB node 102, and the IAB node 102 accesses the network via a parent IAB node. Here, it should be understood that the usage of UE and MT are not mutually exclusive, and one should presume that either term can refer to either a MT or UE. It should also be understood that a parent IAB node should be understood to be encompassed by the term base station. It should be understood that, although a moveable vehicle has been discussed, the techniques disclosed herein are also applicable to static IAB nodes, which may want to perform migration due to load balance or due to Back Haul Radio Link Failure (BH RLF).

The relative positions between the UEs 103-106 and the IAB node 102 will change little as the train 101 travels across. However, the relative position between the IAB node 102 and each IAB donor will change frequently when the train 101 travels.

Consequently, this disclosure provides systems and methods performing handover of the IAB node 102 can be performed. This reduces signaling overhead and improves service continuity.

Figure 2:
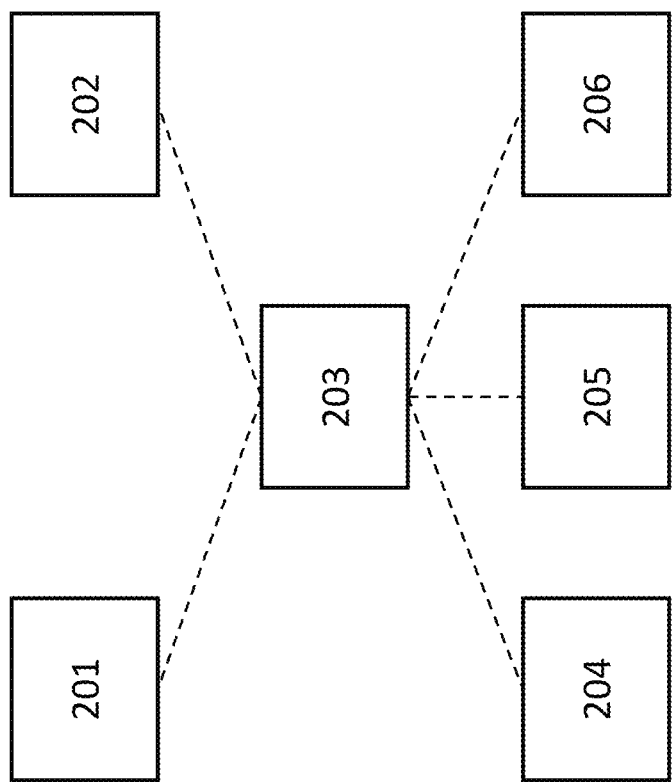
FIG. 2 illustrates an embodiment of an IAB topology.

FIG. 2 illustrates an IAB topology. Parent nodes 201 and 202 have IAB-DU functionality, and they provide NR access to an IAB node 203. IAB node 203 has functionality as both an IAB MT and as an IAB DU. IAB node 203 can connect to parent nodes 201 and 202 as a IAB MT, and also provide access to child nodes 204-206 as a IAB DU. Child nodes 204-206 have functionality of an IAB MT. As can be understood, any node in the topology can work as a donor or a terminal, so long as it is designed with that functionality.

Figure 3:
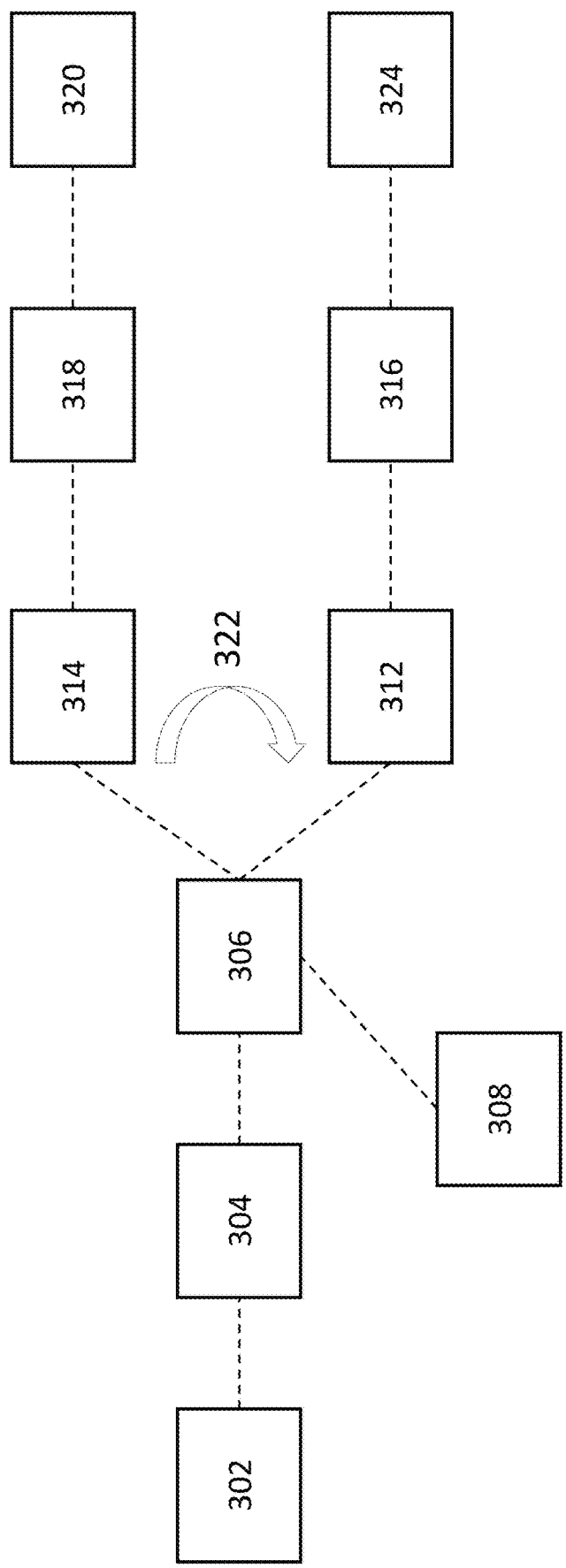
FIG. 3 illustrates an IAB topology where handover of an IAB node is performed.

FIG. 3 illustrates an IAB topology where handover of an IAB node is performed. UE 302 is wirelessly coupled to an IAB node 304, which is wirelessly coupled to IAB node 306. A UE 308 is coupled to IAB node 306. It should be understood that any number of UE or MT can be coupled to any of the IAB nodes.

As denoted from arrow 322, IAB node 306 is migrating from IAB node 314 to IAB node 312. IAB node 314 is coupled to IAB donor DU 318, and IAB node 312 is coupled to IAB donor DU 316. Both IAB donor 318 and 316 are coupled to IAB donor CU.

In an embodiment, there are two options for migration, full or gradual. In a full migration of an IAB-node, the UEs and descendent nodes are migrated from an initial stage to a final stage. The full migration sequence may be useful in scenarios where the source path link quality deteriorates quickly. Gradual migration occurs where IAB-MT, UEs and descendent nodes are migrated to the new IAB-donor over an extended period of time with intermediate stages, where backhaul is fully operational.

Figure 4:
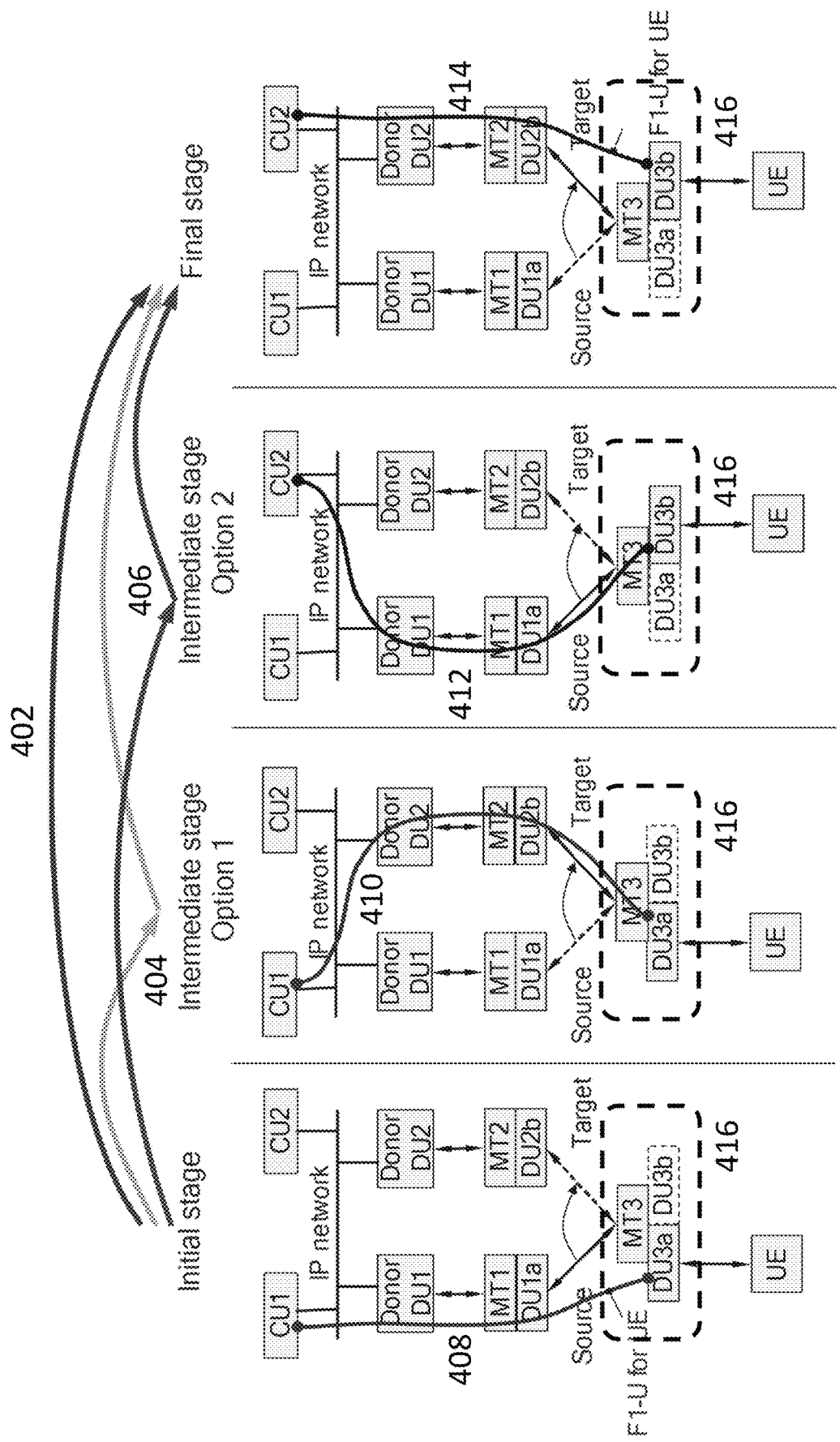
FIG. 4 illustrates both the full and gradual migration for a handover scenario.

FIG. 4 illustrates both the full and gradual migration for a handover scenario. Each of the initial stage, intermediate stage option 1, intermediate stage option 2, and final stage represent the same devices. FIG. 4 illustrates the migration path between devices. As shown in arrow 402, a device will migrate from central unit (CU1), of the initial stage to the CU2 of the final stage. As can be appreciated here, the donor unit (DU) (DU3a) migrates as the DU3b communicatively coupled to the CU2. As illustrated by FIG. 4, a gradual migration can occur using either intermediate stage option 1 (as denoted by arrow 404) or by using intermediate stage option 2 (as denoted by arrow 406). The communication paths for each option from the central unit to the IAB node 416 in each scenario is identified via communication paths 408, 410, 412, and 414.

In an embodiment, IAB node 416 (including the MT and DU) migrates from DU1a to DU2b, and DU1a is controlled by CU1, and DU2b is controlled by CU2. In this situation, IAB node 416's child/descendant IAB node and served UEs migrate to CU2 as well.

In an embodiment, option 1 of FIG. 4 is top-down sequence, which means that the migrating IAB node 416 performs migration first, and then its child nodes and UEs perform migration. In this option, RRC Reconfig and RRC Complete are delivered via the target path.

In an embodiment, option 2 of FIG. 4 is bottom-up sequence, which means UEs performs migration first, and then UE's serving IAB nodes performs migration. The migrating IAB node 416 perform migration last. In this option, RRC Reconfig and RRC Complete are delivered via source path.

Figure 5:
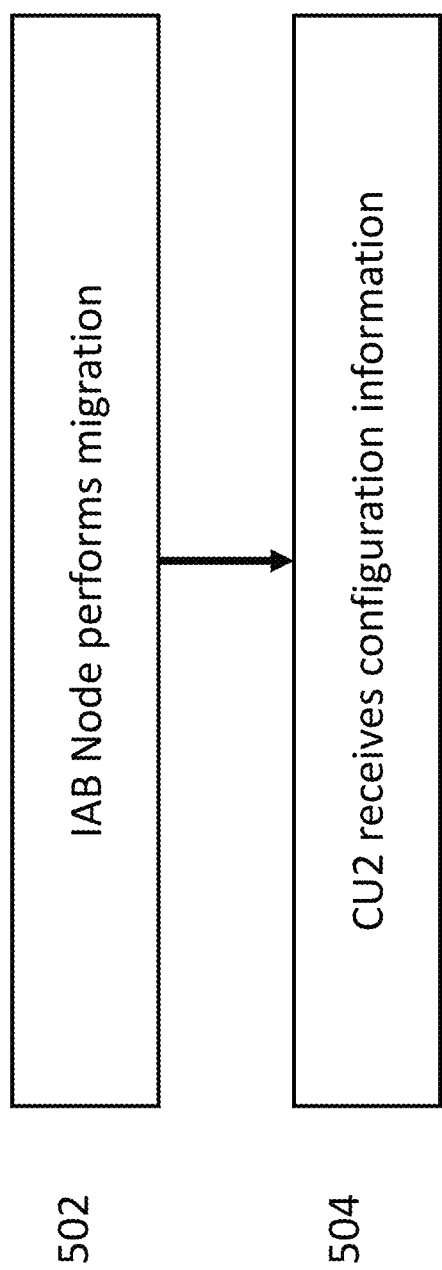
FIG. 5 illustrates a flow-chart for gradual migration in a top-down sequence.

FIG. 5 illustrates a flow-chart for gradual migration in a top-down sequence. In step 502, the IAB node 416 performs migration. In step 504, the CU2 receives configuration information.

As illustrated in option 1 in FIG. 4, IAB Node 416 has migrated to DU2b which is controlled by CU2, while UE has not yet migrated and is served by DU3a which is controlled by CU1. In an embodiment, the radio resource and cell specific channel/signal configuration used in the link between DU3a and UE is configured by CU1, however the resource used in the link between MT3 and DU2b is configured by CU2.

To prevent interference, in an embodiment, the CU2 obtains radio resource and cell specific channel/signal configuration used by DU3 configured by CU1, so that CU2 could configure radio resource for DU2b according to the DU3 resource and cell specific channel/signal configuration. In an embodiment, CU2 obtains the radio resource and cell specific channel/signal configuration from CU1. In this embodiment, CU1 sends radio resource and cell specific channel/signal configuration used by DU3 to CU2 via XnAP message. In an embodiment, CU2 transmits radio resource and cell specific channel or signal information used by DU3 to DU2b.

In another embodiment, CU2 obtains the radio resource and cell specific channel/signal configuration from DU3 (DU3a or DU3b). In this embodiment, DU3 sends radio resource and cell specific channel/signal configuration used by DU3 to CU2 via F1AP message.

In an embodiment, the radio resource configuration includes at least one of the following: Subcarrier Spacing, DUF Transmission Periodicity, DUF Slot Configuration, HSNA Transmission Periodicity, HSNA Slot Configuration.

In an embodiment, the cell specific channel/signals configuration used by DU3a includes at least one of the following: IAB STC Info, RACH Config Common, RACH Config Common IAB, CSI-RS Configuration, SR Configuration, PDCCH Configuration SIB1.

Figure 6:
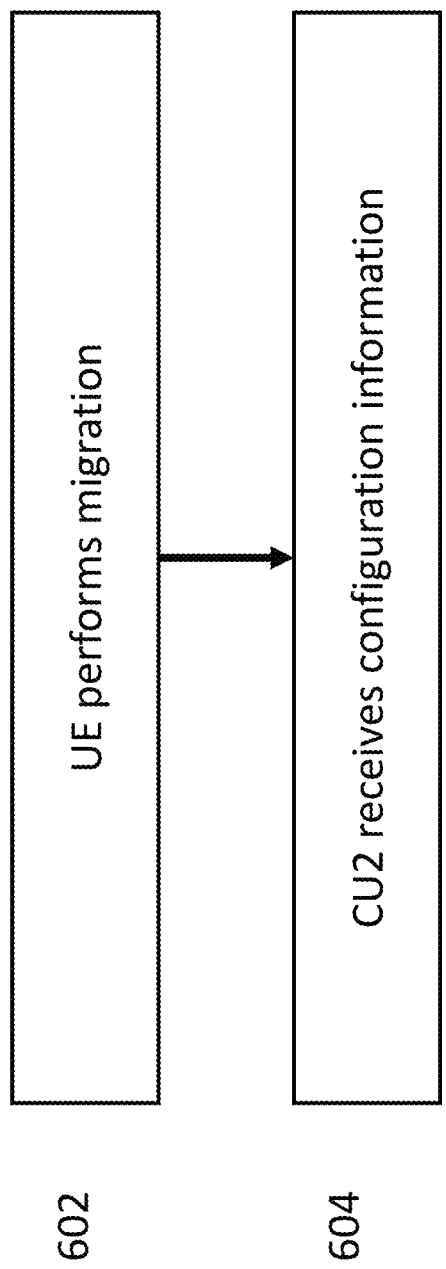
FIG. 6 illustrates a flowchart for gradual migration in a bottom-up sequence.

FIG. 6 illustrates a flowchart for gradual migration in a bottom-up sequence. In step 602, UE performs migration. In step 604, CU2 of FIG. 4 receives configuration information from CU1 or DU3 via XnAP or F1AP message, respectively. In an embodiment, as illustrated in option 2 in FIG. 4, the UE has migrated to DU3b which is controlled by CU2, while MT3 didn't migrate yet and is served by DU1a which is controlled by CU1. The radio resource and cell specific channel/signal configuration used in the link between DU3b and UE is configured by CU2, however the resource used in the link between MT3 and DU1a is configured by CU2.

In an embodiment, to prevent interference, CU2 obtains radio resource and cell specific channel/signal configuration used by DU1a or MT3 configured by CU1 from CU1 or DU3, so that CU2 could configure radio resource for DU3b according to the above resource and cell specific channel/signal configuration. In this embodiment, CU1 sends radio resource and cell specific channel/signal configuration used by DU1a or MT3 to CU2 via XnAP message.

In yet another embodiment, DU3 sends radio resource and cell specific channel/signal configuration used by DU1a or MT3 to CU2 via F1AP message.

In another embodiment, CU1 obtains radio resource and cell specific channel/signal configuration used by DU3b configured by CU2 from CU2 or DU3. In this embodiment, CU2 sends radio resource and cell specific channel/signal configuration used by DU3b to CU1 via XnAP message. In another embodiment, CU1 updates the radio resource for DU1a according to the resource and cell specific channel or signal configuration used by DU3. In another embodiment, CU1 sends radio resource and cell specific channel/signal configuration information used by DU3 to DU1a.

In yet another embodiment, DU3 sends radio resource and cell specific channel/signal configuration used by DU3b to CU1 via F1AP message.

In an embodiment, the radio resource configuration includes at least one of the following: Subcarrier Spacing, DUF Transmission Periodicity, DUF Slot Configuration, HSNA Transmission Periodicity, HSNA Slot Configuration. The cell specific channel/signals configuration used by DU3a includes at least one of the following: IAB STC Info, RACH Config Common, RACH Config Common IAB, CSI-RS Configuration, SR Configuration, PDCCH Configuration SIB1.

Figure 7:
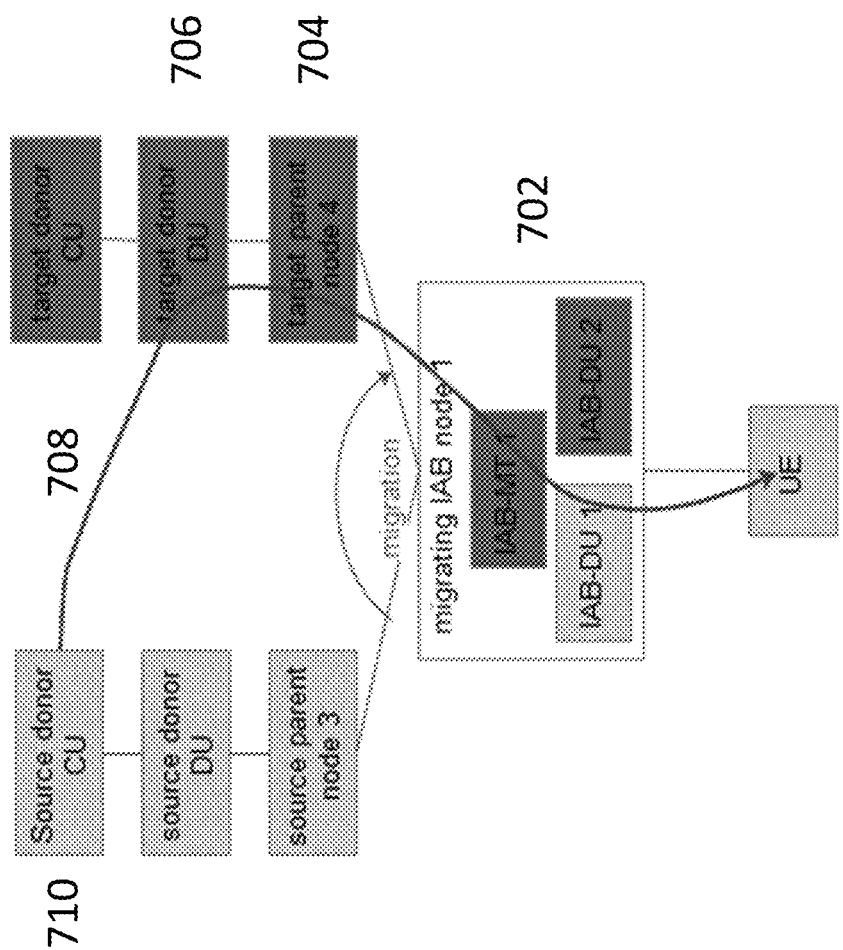
FIG. 7 illustrates packet delivery via a target donor in a top down sequence.

FIG. 7 illustrates packet delivery via a target donor in a top down sequence. In top-down sequence, migrating IAB node 702 performs migration first. In an embodiment, IAB-MT1 migrates to target parent node 4 704 which is connected to target donor CU 706. In an embodiment, UE is still served by IAB-DU1 which is connected to source donor CU 710. During the UE migration procedure, the RRCreconfiguration message for UE is transmitted via target path 708. The RRCreconfiguration message for UE is encapsulated into a F1AP message and sent from source donor CU to IAB-DU1 first. The target IP address for the IP packet of the F1AP message is allocated by target donor. In an embodiment, F1-U packets are transmitted between the source donor CU and IAB-DU1 via the target path. In an embodiment, the packets are F1-C or F1-U packets.

In an embodiment, the target donor CU sends DU's IP address information allocated by target donor to source donor CU via XnAP message.

In another embodiment, the IAB-DU sends its IP address information allocated by target donor or OAM to source donor CU via F1AP message.

In an embodiment, the IP address information contains at least one of the following: IPv4 address, IPv6 address, IPv6 prefix, IP address usage. IP address usage indicates that the IP address information is used for F1-C, or F1-U or non-F1. In another embodiment, target information (e.g. BAP address) could be included in the F1AP message to be sent from CU to DU.

In another embodiment, the target donor CU sends QoS mapping information to source donor CU. And then, source donor CU could use QoS mapping information to set DSCP and/or flow label fields for the downlink IP packets.

In another embodiment, the source donor CU sends QoS mapping information to target donor CU. And then, target donor CU could configure downlink traffic mapping for target donor DU based on the QoS mapping information. In an embodiment, the Qos mapping information includes at least one of the following: IP address information, DSCP, flow label, usage information. The usage information indicates that the Qos mapping information is used for F1-C, or F1-U or non-F1.

Figure 8:
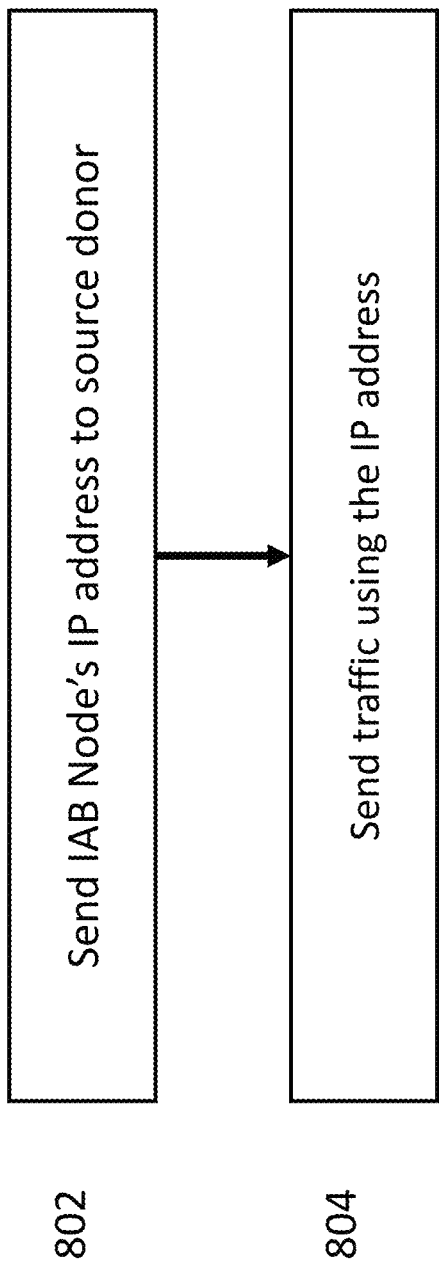
FIG. 8 illustrates a flowchart for configuring packet delivery via a target donor in a top down sequence.

FIG. 8 illustrates a flowchart for configuring packet delivery via a target donor in a top down sequence. As shown in step 802, an IAB node's IP address is sent to the source donor. The IP address can be sent by the target donor CU or the IAB node via XnAP message or F1AP message, respectively.

Figure 9:
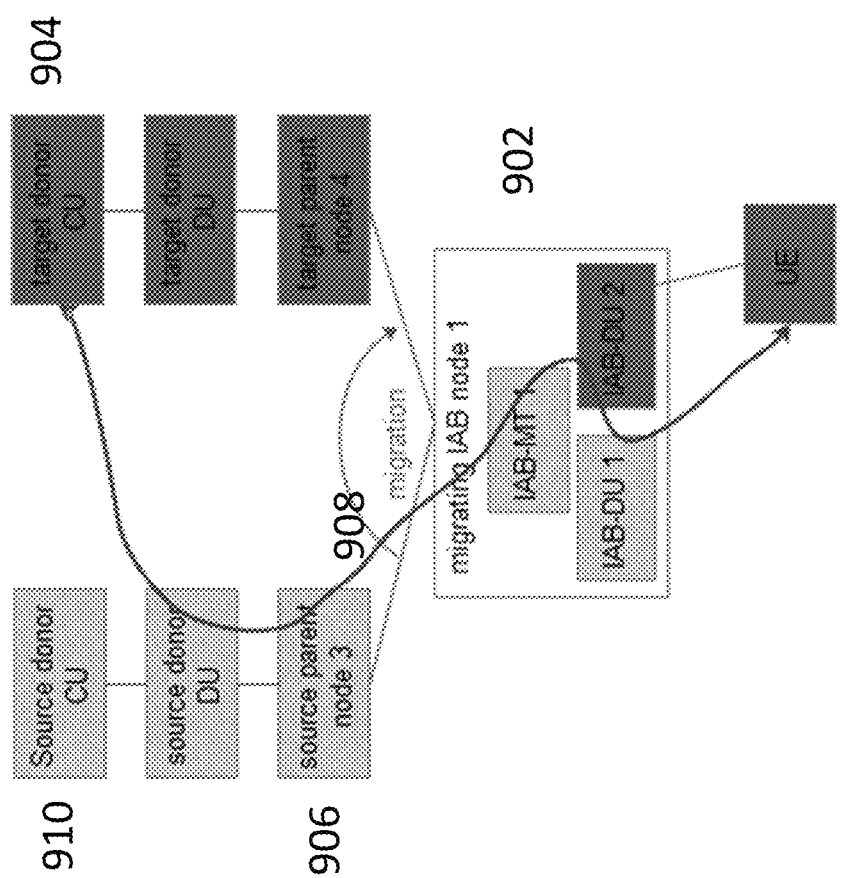
FIG. 9 illustrates configuring packet delivery via source donor DU in a bottom up sequence.

FIG. 9 illustrates configuring packet delivery via source donor DU in a bottom up sequence. In an embodiment for a bottom up sequence, UEs performs migration first, and migrating IAB node 902 performs migration last. As shown in FIG. 9, the migration procedure for UE has finished and UE is controlled by target donor CU 904. The IAB-MT1 is still served by source parent node 906 which is connected to source donor CU 910 and downlink F1-U packets for UE need to be transmitted via source path 908. To allow packets to be delivered via the source path, the IP address allocated by source donor need to be set as the target IP address for those IP packets.

In an embodiment, the source donor CU sends DU's IP address information allocated by source donor to target donor CU via XnAP message.

In an embodiment, IAB-DU sends its IP address information allocated by source donor or OAM to target donor CU via F1AP message.

In an embodiment, the IP address information contains at least one of the following: IPv4 address, IPv6 address, IPv6 prefix, IP address usage. IP address usage indicates that the IP address information is used for F1-C, or F1-U or non-F1.

In an embodiment, the source donor CU sends QoS mapping information to target donor CU. And then, target donor CU could use QoS mapping information to set DSCP and/or flow label fields for the downlink IP packets.

In an embodiment, the target donor CU sends QoS mapping information to source donor CU. And then, source donor CU could configure downlink traffic mapping for source donor DU based on the QoS mapping information.

In an embodiment, the Qos mapping information includes at least one of the following: IP address information, DSCP, flow label, usage information. The usage information indicates that the Qos mapping information is used for F1-C, or F1-U or non-F1.

In an embodiment, in both top-down and bottom-up sequences, the source donor CU is configured to know that a IAB-DU has established: (a) an F1 connection with target donor CU; or (b) has established an F1 association with the target donor CU; or (c) has migrated the F1 connection; or (d) has migrated the F1 association to the target donor CU. In an embodiment, after a IAB-DU has established F1 connection with target donor CU, target donor CU sends indication information to source donor CU via XnAP message. In another embodiment, after a IAB-DU has established F1AP connection with target donor CU, IAB-DU sends indication information to source donor CU via F1AP message.

It should be understood that, while some embodiments describe the transmission of certain data to a node in the IAB deployment, that the disclosure envisions the receipt and further transmission. For instance, where an IAB node is described as transmitting a piece of data intended for a UE, it should be understood that any number of child IAB nodes exist in between the IAB node transmitting the data and the UE. It should be understood that those IAB nodes likewise transmit that data. The same applies for any nodes in between the path of an IAB node transmitting data and the IAB donor CU.

In another embodiment, the source donor CU sends an Xn handover request message to target donor CU to initiate the migration procedure for the IAB node or the UE with a target cell ID included in the Xn handover request message, and the cell ID of IAB-DU cell shall be re-configured by OAM or target donor CU. In an embodiment, both top-down and bottom-up sequence, source donor CU is made aware of the new cell ID of IAB-DU which is configured by OAM or target donor CU. In an embodiment, the source donor CU include target cell information in the XnAP handover request message, and sends the XnAP handover request message to target donor CU. The target cell information includes at least one of the following: 1) Serving cell not changed indication, a default value is defined for target cell ID IE to indicate that serving cell is not changed, serving DU ID, or source cell information, e.g., cell identity information.

In an embodiment, the source donor CU sends indication information to IAB-DU via F1AP message, the indication information is used to indicate that: 1) the F1AP message includes RRC message related to migration or handover; or 2) the F1AP message includes RRC message including ReconfigurationWithSync. In another embodiment, the migration is inter-donor migration or intra-donor migration; or the handover is inter-donor handover or intra-donor handover.

In an embodiment, the source donor CU sends indication information to an IAB node via F1AP message or RRC message, the indication information is used to indicate that: 1) IAB DU cell switch; or 2) use configuration information configured by target IAB donor.

In an embodiment, when at least one of the following condition is met, the same BAP address is configured by IAB donor CU for multiple IAB donor DUs: (a) two or more IAB donor DUs belong to the same sub-net; (b) re-routing is supported among the two or more IAB donor DUs; or (c) IP filtering is disabled at the IAB donor DU.

Figure 10:
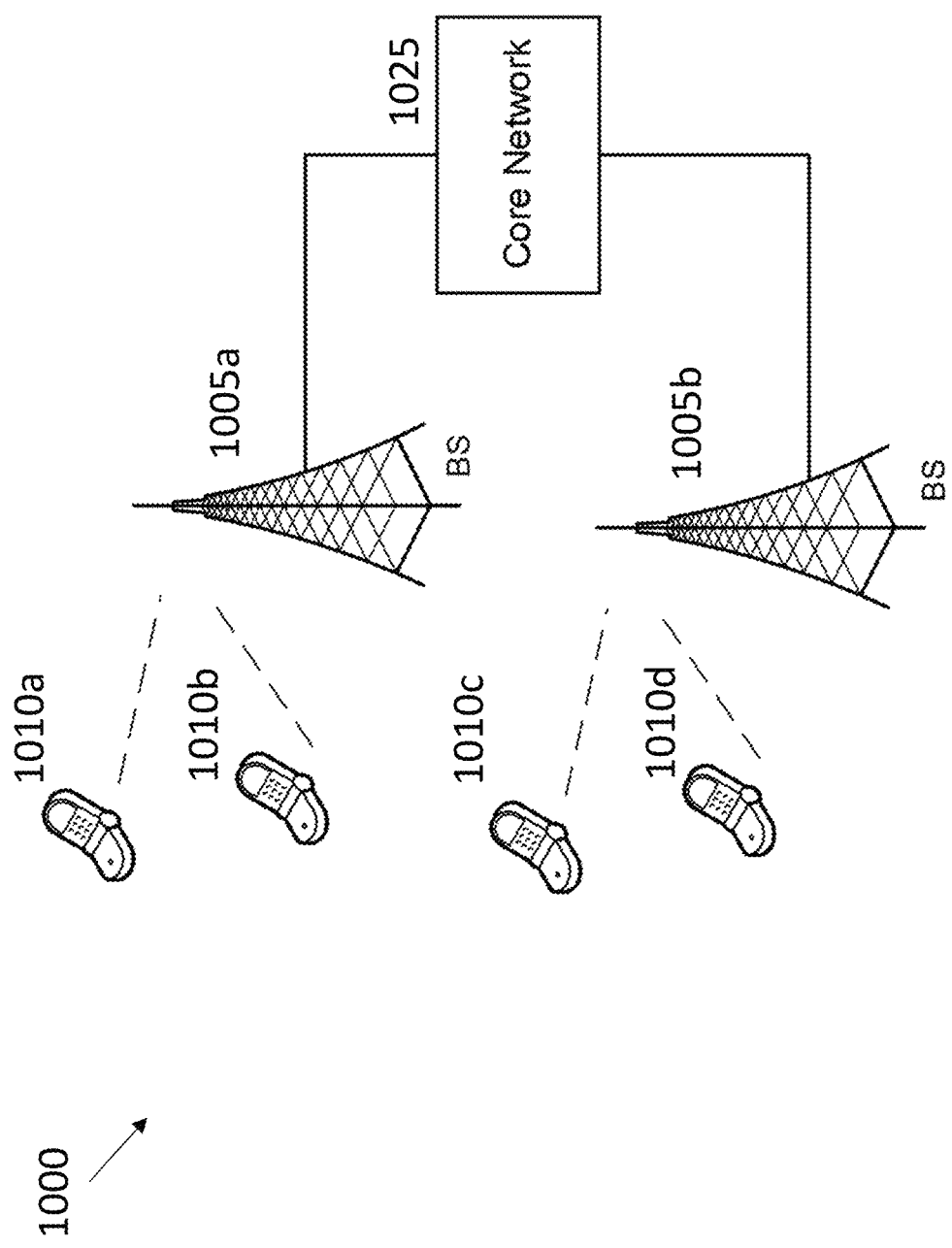
FIG. 10 shows an example of a wireless communication system.

FIG. 10 shows an example of a wireless communication system 1000 where techniques in accordance with one or more embodiments of the present technology can be applied. A wireless communication system 1000 can include one or more base stations (BSs) 1005a, 1005b, one or more wireless devices 1010a, 10010b, 1010c, 1010d, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors. As should be understood, with reference to the embodiments described herein, the base stations can be a series of IAB nodes.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The wireless devices 1010a, 1010b, 1010c, and 1010d can support multiple different radio access technologies. The techniques and embodiments described in the present document may be implemented by the base stations of wireless devices described in the present document.

Figure 11:
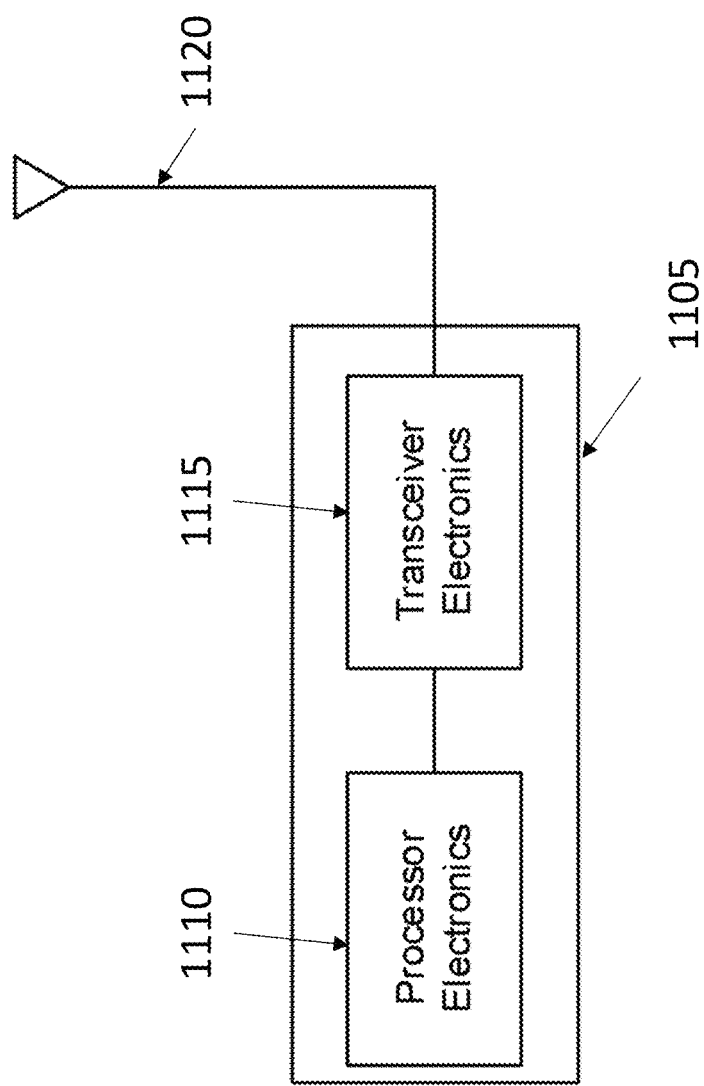
FIG. 11 is a block diagram representation of a portion of a radio station.

FIG. 11 is a block diagram representation of a portion of a radio station in accordance with one or more embodiments of the present technology can be applied. A radio station 1105 such as a base station or a wireless device (or UE) or MT can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105. In some embodiments, the radio station 1105 may be configured to perform the methods described herein.

It will be appreciated that the present document discloses techniques that can be embodied in various embodiments of IAB deployments. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. An information transmission method comprising:
receiving, at a second parent device comprising a second integrated access and backhaul (IAB) donor, configuration information from at least one of a first parent device comprising a first IAB donor that: (a) is used by a wireless device, comprising an IAB node, and configured by the first parent device, or (b) is used by at least one of the wireless device's parent nodes and configured by the first parent device; and
performing, at the second parent device, one of (a) configuring the wireless device or the wireless device's parent node according to the configuration information or (b) sending the configuration information to at least one of the wireless device's parent nodes.

2. The method according to claim 1, wherein: (a) the first IAB donor is a source IAB donor and the second IAB donor is a target IAB donor, and the IAB node migrates from the first IAB donor to the second IAB donor, or (b) the second IAB donor is a source IAB donor and the first donor is a target IAB donor, and the IAB node migrates from the second IAB donor to the first IAB donor, or (c) the first IAB donor is an initial IAB donor and the second IAB donor is a new IAB donor, and the IAB node recovers to the second IAB donor, or (d) the second IAB donor is an initial IAB donor and the first IAB donor is a new IAB donor, and the IAB node recovers to the first IAB donor.

3. The method according to claim 1, wherein the configuration information comprises radio resource configuration information or cell-specific channel or signal configuration information.

4. The method according to claim 3, wherein the second IAB donor receives the configuration information from the first IAB donor via an Xn Application Protocol (XnAP) message.

5. The method according to claim 3, wherein the second IAB donor receives the configuration information from an IAB-donor unit (IAB-DU) via an F1 Application Protocol (F1AP) message.

6. The method according to claim 3, wherein the radio resource configuration information includes an indication of at least one of: Subcarrier Spacing, or downlink/uplink/flexible (DUF) Transmission Periodicity, DUF Slot Configuration, hard/soft/not available (HSNA) Transmission Periodicity, or HSNA Slot Configuration.

7. The method according to claim 3, wherein the cell-specific channel or signal configuration information includes an indication of at least one: IAB SSB (Synchronization Signal Block) transmission configuration (STC) information, RACH Config Common, RACH Config Common IAB, Channel State Information Reference Signals (CSI-RS) Configuration, Scheduling Request (SR) Configuration, or Physical Downlink Control Channel (PDCCH) Configuration SIB1.

8. A second parent device comprising a second integrated access and backhaul (IAB) donor, the second parent device comprising:
at least one processor configured to:
receive, via a receiver, configuration information from at least one of a first parent device comprising a first IAB donor that: (a) is used by a wireless device, comprising an IAB node, and configured by the first parent device, or (b) is used by at least one of the wireless device's parent nodes and configured by the first parent device; and
perform one of (a) configuring the wireless device or the wireless device's parent node according to the configuration information or (b) sending the configuration information to at least one of the wireless device's parent nodes.

9. The second parent device according to claim 8, wherein: (a) the first IAB donor is a source IAB donor and the second IAB donor is a target IAB donor, and the IAB node migrates from the first IAB donor to the second IAB donor, or (b) the second IAB donor is a source IAB donor and the first donor is a target IAB donor, and the IAB node migrates from the second IAB donor to the first IAB donor, or (c) the first IAB donor is an initial IAB donor and the second IAB donor is a new IAB donor, and the IAB node recovers to the second IAB donor, or (d) the second IAB donor is an initial IAB donor and the first IAB donor is a new IAB donor, and the IAB node recovers to the first IAB donor.

10. The second parent device according to claim 8, wherein the configuration information comprises radio resource configuration information or cell-specific channel or signal configuration information.

11. The second parent device according to claim 10, wherein the second IAB donor receives the configuration information from the first IAB donor via an Xn Application Protocol (XnAP) message.

12. The second parent device according to claim 10, wherein the second IAB donor receives the configuration information from an IAB-donor unit (IAB-DU) via an F1 Application Protocol (F1AP) message.

13. The second parent device according to claim 10, wherein the radio resource configuration information includes an indication of at least one of: Subcarrier Spacing, or downlink/uplink/flexible (DUF) Transmission Periodicity, DUF Slot Configuration, hard/soft/not available (HSNA) Transmission Periodicity, or HSNA Slot Configuration.

14. The second parent device according to claim 10, wherein the cell-specific channel or signal configuration information includes an indication of at least one: IAB SSB (Synchronization Signal Block) transmission configuration (STC) information, RACH Config Common, RACH Config Common IAB, Channel State Information Reference Signals (CSI-RS) Configuration, Scheduling Request (SR) Configuration, or Physical Downlink Control Channel (PDCCH) Configuration SIB1.

15. An information transmission method comprising:
sending, by at least one of a first parent device comprising a first integrated access and backhaul (IAB) donor, to a second parent device comprising a second IAB donor, configuration information that: (a) is used by a wireless device, comprising an IAB node, and configured by the first parent device, or (b) is used by at least one of the wireless device's parent nodes and configured by the first parent device,
wherein the second parent device performs one of (a) configuring the wireless device or the wireless device's parent node according to the configuration information or (b) sending the configuration information to at least one of the wireless device's parent nodes.

16. An apparatus, comprising a first parent device comprising a first integrated access and backhaul (IAB) donor, the apparatus comprising:
at least one processor configured to:
send, via a transmitter to a second parent device comprising a second IAB donor, configuration information that: (a) is used by a wireless device, comprising an IAB node, and configured by the first parent device, or (b) is used by at least one of the wireless device's parent nodes and configured by the first parent device,
wherein the second parent device performs one of (a) configuring the wireless device or the wireless device's parent node according to the configuration information or (b) sending the configuration information to at least one of the wireless device's parent nodes.

* * * * *